US012795445B2

(12) United States Patent
Lnu et al.

(10) Patent No.: US 12,795,445 B2
(45) Date of Patent: Nov. 10, 2026

(54) DATA PACKETS COALESCING BASED ON DYNAMICALLY DETERMINED COALESCING EFFICIENCY

(71) Applicant: QUALCOMM Incorporated, San Diego, CA (US)

(72) Inventors: Ujjwal Lnu, Muzaffarpur (IN); Srikanth Rapolu, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 28 days.

(21) Appl. No.: 18/999,601

(22) Filed: Dec. 23, 2024

(65) Prior Publication Data

US 2026/0181476 A1 Jun. 25, 2026

(51) Int. Cl.
*H04W 28/06* (2009.01)
*H04W 28/02* (2009.01)

(52) U.S. Cl.
CPC ....... *H04W 28/06* (2013.01); *H04W 28/0231* (2013.01)

(58) Field of Classification Search
CPC .. H04W 28/06; H04W 28/0231; H04L 47/10; H04L 1/0041
USPC .......................................................... 709/238
See application file for complete search history.

(56) References Cited

U.S. PATENT DOCUMENTS 8,306,062 B1 * 11/2012 Cohen .................. H04L 69/161 370/473
2011/0090920 A1 * 4/2011 Makineni ................ H04L 69/16 370/463
2015/0222562 A1 * 8/2015 Ashokan ................ H04L 47/27 370/412
2016/0205586 A1 * 7/2016 Kim ...................... H04L 1/1835 370/230
2017/0168986 A1 6/2017 Sajeepa et al.
2022/0322131 A1 * 10/2022 Shrestha ................ H04L 69/10
2023/0065594 A1 * 3/2023 Chan ..................... H04W 28/10
2023/0102614 A1 3/2023 Mitra et al.

OTHER PUBLICATIONS

International Search Report and Written Opinion—PCT/US2025/057753—ISA/EPO—Mar. 16, 2026.

* cited by examiner

*Primary Examiner* — Meng Vang
(74) *Attorney, Agent, or Firm* — LOZA & LOZA, LLP

(57) ABSTRACT

Aspects of the present disclosure provide various apparatuses and techniques for coalescing data packets. An apparatus can combine multiple data packets together into a large, coalesced frame to reduce processing overhead. An apparatus can coalesce data packets into a coalesced frame based at least in part on dynamically determined coalescing efficiency. The apparatus can change or adjust the value of the dynamically determined coalescing efficiency based on various real-time conditions and requirements. Instead of operating at a fixed coalescing efficiency, the apparatus can continuously determine and update the coalescing efficiency based on a coalescing efficiency threshold.

16 Claims, 11 Drawing Sheets

600

<table>
<tr><td>C/D<br>606</td><td colspan="2">Next Hdr<br>608</td><td colspan="3">PAD<br>611</td><td colspan="2">MUX ID<br>604</td><td colspan="5">Frame length<br>602</td></tr>
<tr><td colspan="2">Header Type<br>610</td><td colspan="2">Next Hdr<br>608</td><td>CKSUM<br>618</td><td colspan="2">NLs<br>612</td><td>Reserved</td><td>Close Value<br>630</td><td colspan="2">Close Type<br>632</td><td>V. Ch Id/Ct Id<br>620</td><td>Reserved</td></tr>
<tr><td colspan="8">Packet Length<br>624</td><td colspan="2">Checksum error bitmap 622</td><td colspan="3">Number of packets<br>626</td></tr>
<tr><td colspan="8">Packet Length<br>624</td><td colspan="2">Checksum error bitmap 622</td><td colspan="3">Number of packets<br>626</td></tr>
<tr><td colspan="8">Packet Length<br>624</td><td colspan="2">Checksum error bitmap 622</td><td colspan="3">Number of packets<br>626</td></tr>
<tr><td colspan="8">Packet Length<br>624</td><td colspan="2">Checksum error bitmap 622</td><td colspan="3">Number of packets<br>626</td></tr>
<tr><td colspan="8">Packet Length<br>624</td><td colspan="2">Checksum error bitmap 622</td><td colspan="3">Number of packets<br>626</td></tr>
<tr><td colspan="8">Packet Length<br>624</td><td colspan="2">Checksum error bitmap 622</td><td colspan="3">Number of packets<br>626</td></tr>
</table>

FIG. 6

DATA PACKETS COALESCING BASED ON DYNAMICALLY DETERMINED COALESCING EFFICIENCY

FIELD OF THE DISCLOSURE

The technology discussed below relates generally to data communication, and more particularly, to data packets coalescing in data communication based on dynamically determined coalescing efficiency.

INTRODUCTION

A system on chip (SoC) can integrate multiple components, including for example, a central processing unit (CPU), a graphical processing unit (GPU), a digital signal processor (DSP), neural signal processor (NSP) and a modem, into a single chip. Integration of multiple components in the SoC can result in better power efficiency, reduced latency, and improved performance compared to having a separate modem chip. In some aspects, the modem can include a hardware component to accelerate data packet (e.g., Internet Protocol (IP) packets) routing and management for internet protocols. The modem can combine data packets into a coalesced frame to reduce communication overhead and send the coalesced frame to a host (e.g., CPU).

BRIEF SUMMARY

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Aspects of the present disclosure provide various apparatuses and techniques for coalescing data packets. An apparatus can combine multiple data packets together into a large, coalesced frame to reduce processing overhead. An apparatus can coalesce data packets into a coalesced frame based at least in part on dynamically determined coalescing efficiency. The apparatus can change or adjust the value of the dynamically determined coalescing efficiency based on various real-time conditions and requirements.

Instead of operating at a fixed coalescing efficiency, the apparatus can continuously determine and update the coalescing efficiency based on a coalescing efficiency threshold.

In one aspect, the disclosure provides an apparatus for wireless communication. The apparatus includes communication circuitry and one or more processors coupled to the communication circuitry. The one or more processors are configured to determine a coalescing efficiency based on one or more parameters associated with coalescing of a plurality of data packets received at the communication circuitry. The one or more processors are configured to adjust a coalescing process of the plurality of data packets based on the determined coalescing efficiency. The one or more processors are configured to send, via the communication circuitry, a coalesced frame comprising one or more of the plurality of data packets using the coalescing process.

In one aspect, the disclosure provides a method for data communication at an apparatus. The method includes a process of determining a coalescing efficiency based on one or more parameters associated with coalescing of a plurality of data packets received at the apparatus. The method further includes a process of adjusting a coalescing process of the plurality of data packets based on the determined coalescing efficiency. The method further includes a process of sending a coalesced frame comprising one or more of the plurality of data packets using the coalescing process.

In one aspect, the disclosure provides an apparatus for data communication. The apparatus includes mean for determining a coalescing efficiency based on one or more parameters associated with coalescing of a plurality of data packets received at the apparatus. The apparatus further includes means for adjusting a coalescing process of the plurality of data packets based on the determined coalescing efficiency. The apparatus further includes means for sending a coalesced frame comprising one or more of the plurality of data packets using the coalescing process.

These and other aspects will become more fully understood upon a review of the detailed description, which follows. Other aspects, features, and examples will become apparent to those of ordinary skill in the art, upon reviewing the following description of specific, exemplary aspects of in conjunction with the accompanying figures. While features can be discussed relative to certain aspects and figures below, all aspects can include one or more of the advantageous features discussed herein. In other words, while one or more aspects can be discussed as having certain advantageous features, one or more of such features can also be used in accordance with the various aspects discussed herein. In similar fashion, while exemplary aspects can be discussed below as device, system, or method aspects, such exemplary aspects can be implemented in various devices, systems, and methods.

BRIEF DESCRIPTION OF THE DRAWINGS

FIG. 6 is a diagram illustrating an exemplary header format of a coalesced frame according to some aspects.

DETAILED DESCRIPTION

Figure 1:
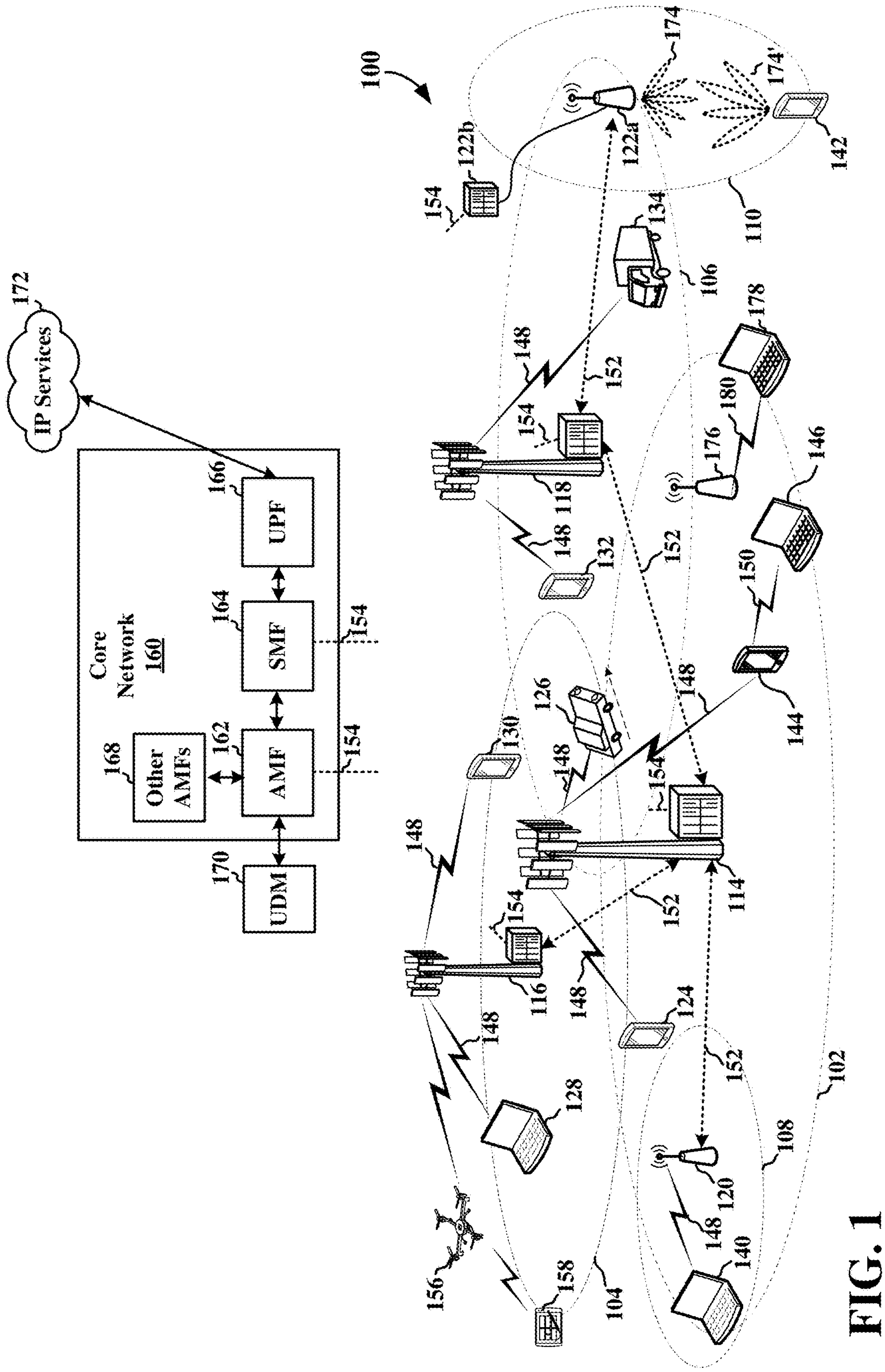
FIG. 1 is a diagram illustrating an example of a wireless radio access network (RAN) according to some aspects.

The detailed description set forth below in connection with the appended drawings is intended as a description of various configurations and is not intended to represent the only configurations in which the concepts described herein can be practiced. The detailed description includes specific details for the purpose of providing a thorough understanding of various concepts. However, it will be apparent to those skilled in the art that these concepts can be practiced without these specific details. In some instances, well known structures and components are shown in block diagram form in order to avoid obscuring such concepts.

While aspects and features are described in this application by illustration to some examples, those skilled in the art will understand that additional implementations and use cases can come about in many different arrangements and scenarios. Aspects described herein can be implemented across many differing platform types, devices, systems, shapes, sizes, and packaging arrangements. For example, aspects and/or uses can come about via integrated chip devices and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described aspects may occur. Implementations may range in spectrum from chip-level or modular components to non-modular, non-chip-level implementations and further to aggregate, distributed, or OEM devices or systems incorporating one or more aspects of the described aspects. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, disaggregated arrangements (e.g., network entity and/or UE), end-user devices, etc. of varying sizes, shapes and constitution.

Aspects of the present disclosure provide various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

In some aspects, a communication apparatus can reduce processing inefficiencies or data packet processing times by grouping multiple data packets into a coalesced packet. For example, a modem can combine multiple data packets together into a large, coalesced frame to reduce processing overhead. Coalescing packets can use a timer based method, a threshold based method, and a hybrid of both methods. In the timer based method, the modem coalesce packets into a coalescing until a predetermined time period is lapsed. The timer based method can suffer from unnecessary wait time and is inefficient for low latency cases. In the threshold based method, the modem coalesces packets into a coalesced frame until a predetermined packet threshold is met. The threshold based method can be inefficient for low throughput cases. The hybrid method can still suffer from long latency issues in coalescing packets in some cases.

Various aspects of the disclosure relate generally to coalescing data packets into a coalesced frame based at least in part on dynamically determined coalescing efficiency. In some aspects, a communication apparatus can group a plurality of data packets, and send the grouped data packets (coalesced frame) to a host. In some aspects, the communication apparatus (e.g., modem) and the host can both be included in a same device, such as a user equipment (UE), a network entity, or a network controller. The apparatus can change or adjust the value of the dynamically determined coalescing efficiency based on various real-time conditions and requirements. Instead of operating at a fixed coalescing efficiency, the apparatus can continuously determine and update the coalescing efficiency based on a coalescing efficiency threshold.

The various concepts presented throughout this disclosure may be implemented across a broad variety of telecommunication systems, network architectures, and communication standards. Referring now to FIG. 1, as an illustrative example without limitation, a schematic illustration of a wireless communication network including a radio access network (RAN) 100 and a core network 160 is provided. The RAN 100 may implement any suitable wireless communication technology or technologies to provide radio access. As one example, the RAN 100 may operate according to $3^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. In other examples, the RAN 100 may operate according to a hybrid of 5G NR and 6G, may operate according to 6G, or may operate according to other future radio access technology (RAT). Of course, many other examples may be utilized within the scope of the present disclosure.

The geographic region covered by the RAN 100 may be divided into a number of cellular regions (cells) that can be uniquely identified by a user equipment (UE) based on an identification broadcasted over a geographical area from one access point or network entity. FIG. 1 illustrates cells 102, 104, 106, 108, and 110 each of which may include one or more sectors (not shown). A sector is a sub-area of a cell. All sectors within one cell are served by the same network entity. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective network entity serves each cell. Broadly, a network entity is responsible for radio transmission and reception in one or more cells to or from a UE. A network entity may also be referred to by those skilled in the art as a base station (e.g., an aggregated base station or disaggregated base station), base transceiver station (BTS), a radio base station, a radio transceiver, a transceiver function, a basic service set (BSS), an extended service set (ESS), an access point (AP), a Node B (NB), an evolved NB (eNB), a 5G NB (gNB), a transmission receive point (TRP), or some other suitable terminology. In some examples, a network entity may include two or more TRPs that may be collocated or non-collocated. Each TRP may communicate on the same or different carrier frequency within the same or different frequency band. In examples where the RAN 100 operates according to both the LTE and 5G NR standards, one of the network entities may be an LTE network entity, while another network entity may be a 5G NR network entity.

In some examples, the RAN 100 may employ an open RAN (O-RAN) to provide a standardization of radio interfaces to procure interoperability between component radio equipment. For example, in an O-RAN, the RAN may be disaggregated into a centralized unit (CU), a distributed unit (DU), and a radio unit (RU). The RU is configured to transmit and/or receive (RF) signals to and/or from one or more UEs. The RU may be located at, near, or integrated with, an antenna. The DU and the CU provide computational functions and may facilitate the transmission of digitized radio signals within the RAN 100. In some examples, the DU may be physically located at or near the RU. In some examples, the CU may be located near the core network 160.

The DU provides downlink and uplink baseband processing, a supply system synchronization clock, signal processing, and an interface with the CU. The RU provides downlink baseband signal conversion to an RF signal, and uplink RF signal conversion to a baseband signal. The O-RAN may include an open fronthaul (FH) interface between the DU and the RU. Aspects of the disclosure may be applicable to an aggregated RAN and/or to a disaggregated RAN (e.g., an O-RAN).

Various network entity arrangements can be utilized. For example, in FIG. 1, network entities 114, 116, and 118 are shown in cells 102, 104, and 106; and another network entity 122 is shown controlling a remote radio head (RRH) 122 in cell 110. That is, a network entity can have an integrated antenna or can be connected to an antenna or RRH by feeder cables. In the illustrated example, the cells 102, 104, 106, and 110 may be referred to as macrocells, as the network entities 114, 116, 118, and 122 support cells having a large size. Further, a network entity 120 is shown in the cell 108 which may overlap with one or more macrocells. In this example, the cell 108 may be referred to as a small cell (e.g., a microcell, picocell, femtocell, home base station, home Node B, home eNode B, etc.), as the network entity 120 supports a cell having a relatively small size. Cell sizing can be done according to system design as well as component constraints.

It is to be understood that the RAN 100 may include any number of network entities and cells. Further, a relay node may be deployed to extend the size or coverage area of a given cell. In some examples, a cell may not necessarily be stationary, and the geographic area of the cell may move according to the location of a mobile network entity.

FIG. 1 further includes an aerial vehicle (AV) 156, which may be a quadcopter. The AV 156 may be configured to function as a network entity, or more specifically as a mobile network entity. That is, in some examples, a cell may not necessarily be stationary, and the geographic area of the cell may move according to the location of a mobile network entity such as the AV 156.

In addition to other functions, the network entities 114, 116, 118, 120, and **122*a*/122*b* may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The network entities 114, 116, 118, 120, and 122*a*/122*b* may communicate directly or indirectly (e.g., through the core network 170) with each other over backhaul links 152 (e.g., X2 interface). The backhaul links 152** may be wired or wireless.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 124, 126, and 144 may be in communication with network entity 114; UEs 128 and 130 may be in communication with network entity 116; UEs 132 and 138 may be in communication with network entity 118; UE 140 may be in communication with network entity 120; UE 142 may be in communication with network entity **122*a* via RRH 122*b*; and UE 158 may be in communication with mobile network entity 156. Here, each network entity 114**, 116, 118, 120, 122*a*/122*b*, and 156 may be configured to provide an access point to the core network 170 (not shown) for all the UEs in the respective cells. In another example, a mobile network node (e.g., AV 156) may be configured to function as a UE. For example, the AV 156 may operate within cell 104 by communicating with network entity 116. UEs may be located anywhere within a serving cell. UEs that are located closer to a center of a cell (e.g., UE 132) may be referred to as cell center UEs, whereas UEs that are located closer to an edge of a cell (e.g., UE 134) may be referred to as cell edge UEs. Cell center UEs may have a higher signal quality (e.g., a higher reference signal received power (RSRP) or signal-to interference-plus-noise ratio (SINR)) than cell edge UEs.

In the RAN 100, the ability for a UE to communicate while moving, independent of their location, is referred to as mobility. The various physical channels between the UE and the RAN are generally set up, maintained, and released under the control of an access and mobility management function (AMF), which may include a security context management function (SCMF) that manages the security context for both the control plane and the user plane functionality and a security anchor function (SEAF) that performs authentication. In some examples, during a call facilitated by a network entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE May undertake a handoff or handover from the serving cell to the neighboring (target) cell. For example, UE 126 may move from the geographic area corresponding to its serving cell 102 to the geographic area corresponding to a neighbor cell 106. When the signal strength or quality from the neighbor cell 106 exceeds that of its serving cell 102 for a given amount of time, the UE 126 may transmit a reporting message to its serving network entity 114 indicating this condition. In response, the UE 126 may receive a handover command, and the UE may undergo a handover to the cell 106.

Wireless communication between a RAN 100 and a UE (e.g., UE 124, 126, or 144) may be described as utilizing communication links 148 over an air interface. Transmissions over the communication links 148 between the network entities and the UEs may include uplink (UL) (also referred to as reverse link) transmissions from a UE to a network entity and/or downlink (DL) (also referred to as forward link) transmissions from a network entity to a UE. For example, DL transmissions may include unicast or broadcast transmissions of control information and/or data (e.g., user data traffic or other type of traffic) from a network entity (e.g., network entity 114) to one or more UEs (e.g., UEs 124, 126, and 144), while UL transmissions may include transmissions of control information and/or traffic information originating at a UE (e.g., UE 124). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

The communication links 148 may use multiple-input and multiple-output (MIMO) antenna technology, including spatial multiplexing, beamforming, and/or transmit diversity. For example, as shown in FIG. 1, network entity 122*a*/122*b* may transmit a beamformed signal to the UE 142 via one or more beams 174 in one or more transmit directions. The UE 142 may further receive the beamformed signal from the network entity 122*a*/122*b* via one or more beams 174' in one or more receive directions. The UE 142 may also transmit a beamformed signal to the network entity 122*a*/122*b* via the one or more beams 174' in one or more transmit directions. The network entity 122*a*/122*b* may further receive the beamformed signal from the UE 142 via the one or more beams 174 in one or more receive directions. The network entity 122*a*/122*b* and the UE 142 may perform beam training to determine the best transmit and receive beams 174/174' for communication between the network entity 122*a*/122*b* and the UE 142. The transmit and receive beams for the network entity 122*a*/122*b* may or may not be the same. The transmit and receive directions for the UE 142 may or may not be the same.

The communication links 148 may utilize one or more carriers. The network entities and UEs may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The communication links 148 in the RAN 100 may further utilize one or more multiplexing and multiple access algorithms to enable simultaneous communication of the various devices. For example, 5G NR specifications provide multiple access for UL or reverse link transmissions from UEs 124, 126, and 144 to network entity 114, and for multiplexing DL or forward link transmissions from the network entity 114 to UEs 124, 126, and 144 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the network entity 114 to UEs 124, 126, and 144 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the communication links 148 in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex (FD).

In various implementations, the communication links 148 in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The electromagnetic spectrum on is often subdivided, based frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHZ), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

In some examples, access to the air interface may be scheduled, wherein a scheduling entity (e.g., a network entity 114) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs (e.g., UE 124), which may be scheduled entities, may utilize resources allocated by the scheduling entity 114.

Network entities are not the only entities that may function as scheduling entities. That is, in some examples, a UE may function as a scheduling entity, scheduling resources for one or more scheduled entities (e.g., one or more other UEs). For example, two or more UEs (e.g., UEs 144 and 146) may communicate with each other using peer to peer (P2P) or sidelink signals via a sidelink 150 therebetween without relaying that communication through a network entity (e.g., network entity 114). In some examples, the UEs 144 and 146 may each function as a scheduling entity or transmitting sidelink device and/or a scheduled entity or a receiving sidelink device to communicate sidelink signals therebetween without relying on scheduling or control information from a network entity (e.g., network entity 114). In other examples, the network entity 114 may allocate resources to the UEs 144 and 146 for sidelink communication. For example, the UEs 144 and 146 may communicate using sidelink signaling in a P2P network, a device-to-device (D2D) network, vehicle-to-vehicle (V2V) network, a vehicle-to-everything (V2X), a mesh network, or other suitable network.

In some examples, a D2D relay framework may be included within a cellular network to facilitate relaying of communication to/from the network entity 114 via D2D links (e.g., sidelink 150). For example, one or more UEs (e.g., UE 144) within the coverage area of the network entity 114 may operate as a relaying UE to extend the coverage of the network entity 114, improve the transmission reliability to one or more UEs (e.g., UE 146), and/or to allow the network entity to recover from a failed UE link due to, for example, blockage or fading.

The wireless communications system may further include a Wi-Fi access point (AP) 176 in communication with Wi-Fi stations (STAs) 178 via communication links 180 in a 5 GHz unlicensed frequency spectrum. When communicating in an unlicensed frequency spectrum, the STAs 170/AP 176 may perform a clear channel assessment (CCA) prior to communicating in order to determine whether the channel is available.

The network entities 114, 116, 118, 120, and 122*a*/122*b* provide wireless access points to the core network 160 for any number of UEs or other mobile apparatuses via core network backhaul links 154. The core network backhaul links 154 may provide a connection between the network entities 114, 116, 118, 120, and 122*a*/122*b* and the core network 170. In some examples, the core network backhaul links 154 may include backhaul links 152 that provide interconnection between the respective network entities. The core network may be part of the wireless communication system and may be independent of the radio access technology used in the RAN 100. Various types of backhaul interfaces may be employed, such as a direct physical connection (wired or wireless), a virtual network, or the like using any suitable transport network.

The core network 160 may include an Access and Mobility Management Function (AMF) 162, other AMFs 168, a Session Management Function (SMF) 164, and a User Plane Function (UPF) 166. The AMF 162 may be in communication with a Unified Data Management (UDM) 170. The AMF 162 is the control node that processes the signaling between the UEs and the core network 160. Generally, the AMF 162 provides QoS flow and session management. All user Internet protocol (IP) packets are transferred through the UPF 166. The UPF 166 provides UE IP address allocation as well as other functions. The UPF 166 is configured to couple to IP Services 172. The IP Services 172 may include the Internet, an intranet, an IP Multimedia Subsystem (IMS), a packet-switched (PS) Streaming Service, and/or other IP services.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB (gNB), access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In some aspects, a device (for example, network entity 114 or UE 124) can receive, using a modem of the device, a plurality of data packets associated with one or more connections. The modem can coalesce one or more of the plurality of data packets into a coalesced frame based at least in part on coalescing efficiency, which can be dynamically determined. Then, the modem can send the coalesced frame to a processor (e.g., a host) of the device.

Figure 2:
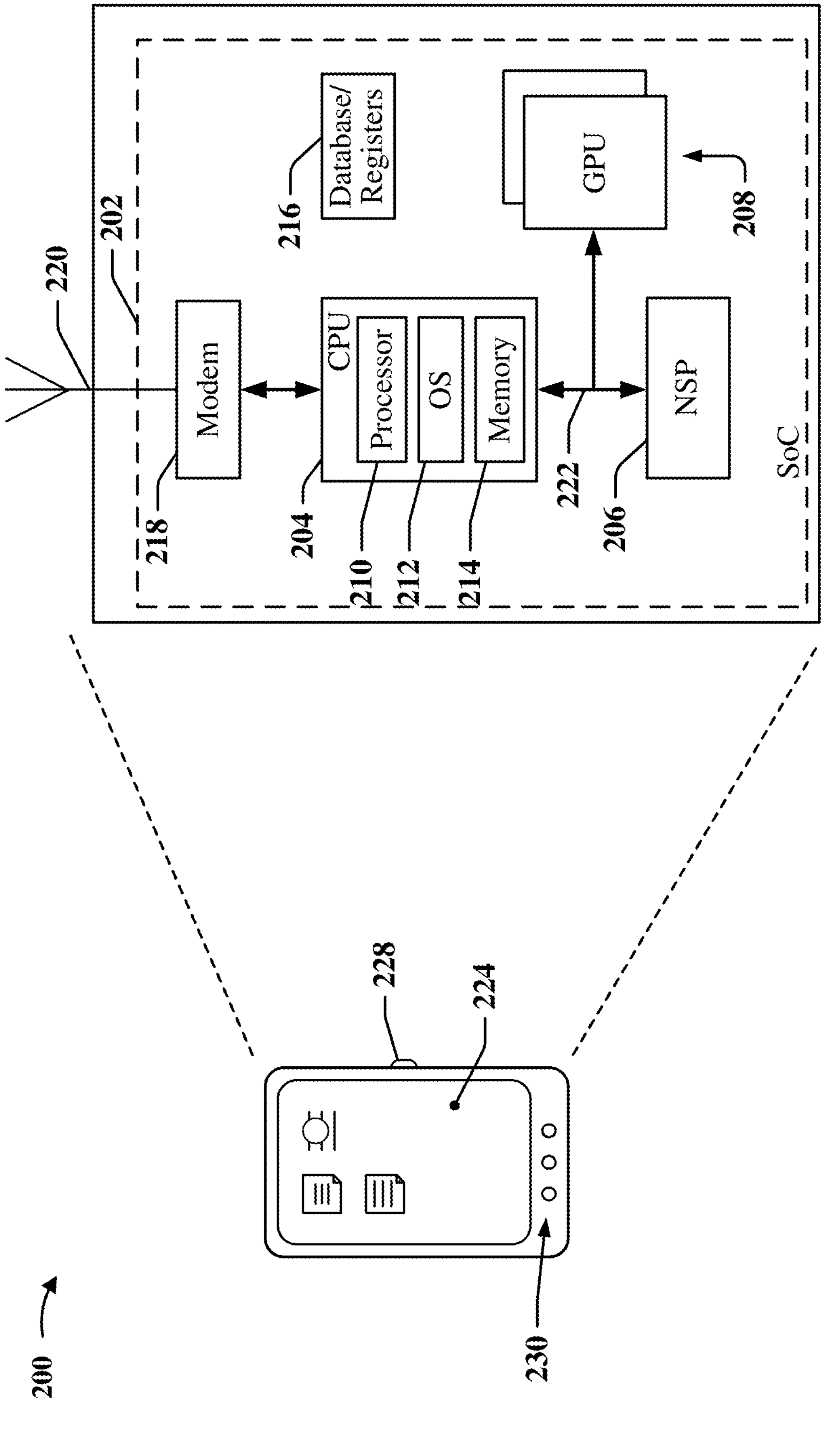
FIG. 2 is a diagram illustrating an exemplary implementation of a network entity and a user equipment (UE) according to some aspects.

FIG. 2 is a diagram depicting an apparatus employing a system-on-chip (SoC) according to some aspects. In one example, the apparatus 200 may include a radio communication device that communicates through a modem 218 with a radio access network (RAN), a core access network, the Internet and/or another network. The modem 218 may be embodied in, or operably coupled to a SoC 202 (the former being illustrated). In some aspect, the modem 218 can include one or more transceivers for wired and/or wireless communication. The SoC 202 may include one or more electronic control units (ECUs), such as a CPU 204, a NSP 206, and a GPU(s) 208. In an example, the CPU 204 may include a processor 210 and memory 214 (e.g., L1 and/or L2 caches or registers or RAM), and may be controlled by an operating system 112 that is loaded from internal or external storage as data and instructions that are executable by the processor 210. The SoC 202 may further include or access a local database 216, which may be implemented in the memory 214, for example, where the database 216 can be used to maintain operational parameters and other information used to configure and operate the apparatus 200. The local database 216 may be implemented as a set of registers, or may be implemented in a database module, flash memory, magnetic media, non-volatile or persistent storage, optical media, tape, soft or hard disk, or the like.

The SoC 202 may also be operably coupled to internal and/or external devices such as an antenna 220, a display/user interface (e.g., a touchscreen including a touch panel) 224, operator controls, such as buttons 228, 230, and other components. For example, a touchscreen may include a touch panel layered on top of a visual display of the apparatus 200 that provides a user interface to a user of the apparatus 200.

A data communication interface (e.g., bus) 222 may be provided to support communication between the ECUs 204, 206, 208, and/or one or more peripherals, such as the touch panel 224. The data communication interface 222 may be operated in accordance with standard protocols defined for interconnecting certain components of mobile devices. For example, there may be multiple types of interfaces defined for communications between CPU 204, the display 224 (e.g., touchscreen including a touch panel), and camera components of a mobile device. In some aspects, the modem 218 can coalesce a plurality of packets into a coalesced frame based on dynamically determined coalescing efficiency of the device.

A device (e.g., a UE 124, a network entity 114) can communicate with another device over a wired or wireless network using various communication protocols. For example, a device can transmit data packets to or receive data packets from another device using one or more of Internet protocol (IP) packets, transmission control protocol (TCP) packets, and/or user datagram protocol (UDP) packets. In some aspects, a modem of the device can transfer a received data packet to a host (for example, a processor) of the device. The host can process a data packet through one or more layers of a network protocol stack (for example, a TCP/IP-based stack, a UDP-based stack, or an open systems interconnection (OSI)-based stack) in order to strip one or more headers of the data packet and obtain a payload of the data packet. In some aspects, the device (e.g., modem) can coalesce multiple packets (e.g., TCP packets) into a coalesced frame.

In some aspects, the modem can reduce processing inefficiencies or data packet processing times at the host by grouping multiple data packets into a coalesced frame based on coalescing efficiency. In this disclosure, coalescing of two or more received data packets at a modem can be referred to as receive side coalescing (RSC). The data packets that are combined can be associated with consecutive data segments. The modem can provide the coalesced data packets to the host for processing through a network protocol stack (e.g., TCP/IP).

Figure 3:
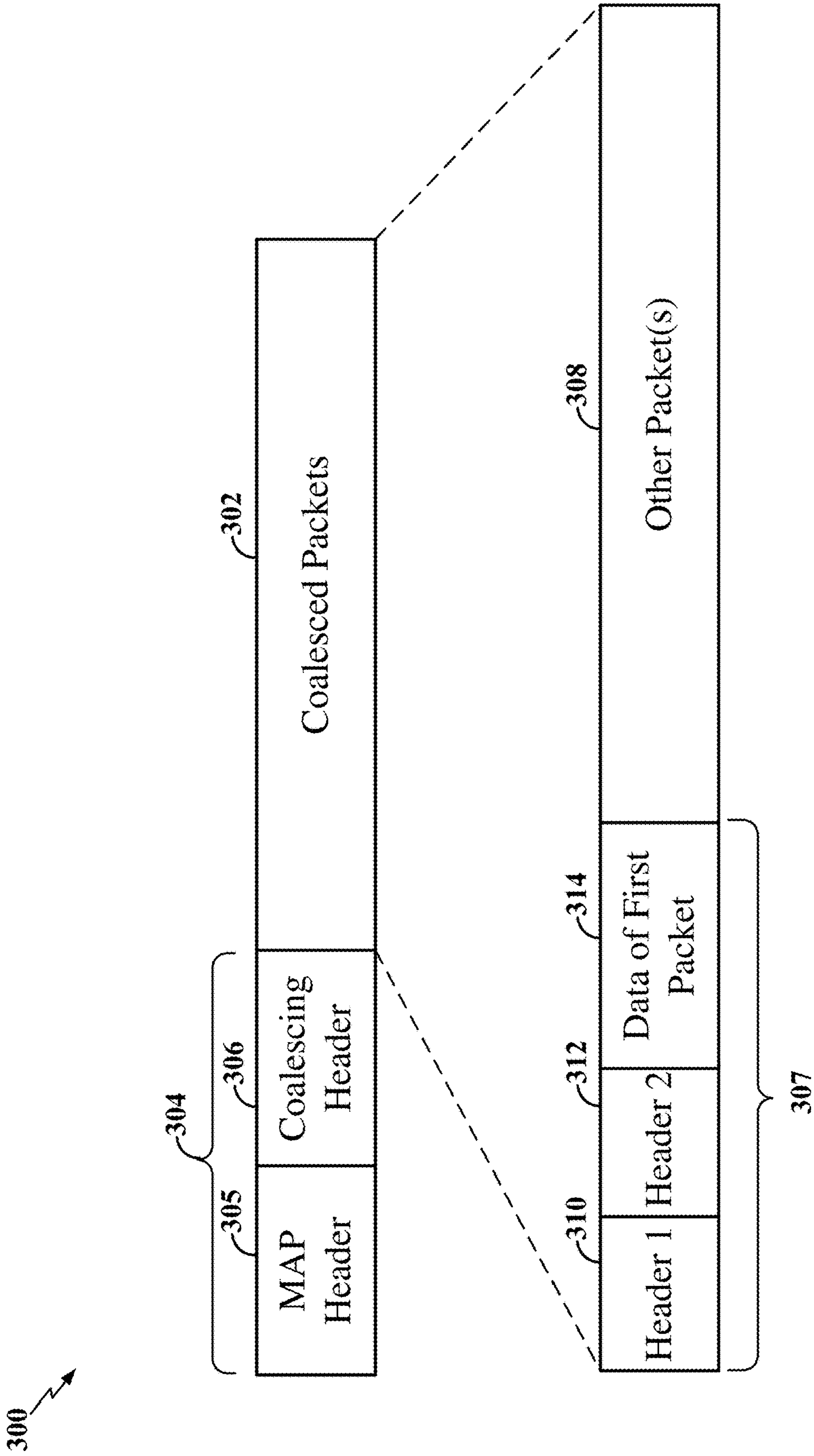
FIG. 3 is a diagram illustrating an example of a coalesced frame according to some aspects.

FIG. 3 is a diagram illustrating an exemplary coalesced frame 300 according to some aspects of the disclosure. For example, the coalesced frame 300 can include coalesced packets 302 (e.g., IP packets) and a frame header 304. In some aspects, the frame header 304 includes a multiplexing and aggregation protocol (MAP) header 305 and a coalescing header 306. The frame header 304 will be described in more detail below with an example illustrated in FIG. 6.

The coalesced packets 302 can include a first data packet 307 and one or more additional data packets 308. In some aspects, the first data packet 307 can include one or more headers (e.g., a first header 310 and a second header 312 shown in FIG. 3), and a data portion 314. The host (e.g., a processor of the UE 122) only needs to decode or decipher the headers 310 and 312 from the coalesced frame 300 as opposed to individual headers (or sets of headers) from each data packet if sent individually. In one example, the first header 310 can be a Layer 3 (L3) header (e.g., IP header) and the second header 312 can be a Layer 4 (L4) header (e.g., TCP/UDP header). In some aspects, header 310 is a IP header and header 312 is a TCP header. A device can process these headers to extract various information such as source and destination addresses, port numbers, control flags, and checksums. The information can be used by the receiving application to ensure reliable data delivery and maintain the communication session.

In some aspects, the frame header 304 can provide the information needed to decode or decipher the data packets in the coalesced frame. The frame header 304 can have a length field that indicates the full coalesced packet length including padding bits (if used).

In some aspects, a device can coalesce multiple data packets into a coalesced frame using one or more schemes, for example, a time-based scheme, a threshold-based scheme, or a hybrid scheme. Using a time-based scheme, a device can group individual data packets into a coalesced frame based on a specific time interval or limit. For example, the device can group a plurality of data packets that are received withing a predetermined time interval or limit. This approach can improve network efficiency by reducing the number of data packets transmitted separately, thus minimizing overhead, saving bandwidth, and reducing the processing load at the receiving device. Threshold-based schemes group individual data packets into a coalesced frame based on a certain predefined threshold, for example, the number of data packets, total data size of the coalesced frame, and/or coalescing buffer occupancy. Once the predefined threshold is reached, the device can coalesce the data packets and send them as a single coalesced frame. Using the hybrid scheme, the device can combine features of the time-based scheme and threshold-based scheme. For example, the device can use both a time-based condition (e.g., a time interval for coalescing) and a predefined threshold (e.g., number of packets or frame size) to determine when to stop coalescing packets and transmit a coalesced frame. The device can send the coalesced frame when at least one of these conditions is met.

In one example, a device can start a timer before initiating a packet coalescing process. For example, the timer can be set for a time interval of 3 milliseconds (ms). The device can further allocate a buffer of 64 kilobytes (KB) and begin coalescing packets. The device stops the coalescing once either condition is met, for example, the buffer is full or the timer expires. In one example, if the buffer is completely filled before the timer expires (or the time interval lapses), the device coalesces the data packets into a 64 KB coalesced frame. In another example, if the timer expires before the buffer is full (e.g., a 64 KB buffer filled with only 40 KB of data), the device stops coalescing at that point and groups the data packets into a coalesced frame including 40 KB of data.

In any coalescing scheme, latency is a key consideration because the coalescing process can introduce delays before packets are sent. If the timer expires before the threshold is met, the coalesced frame will be sent, which ensures the packets are not delayed indefinitely or excessively. However, the overall latency is at least equal to the duration of the time window for coalescing packets. When the threshold (e.g., packets in a coalescing buffer) is met before the timer expires, the device can send the packets. Although this reduces the potential delay compared to a purely time-based coalescing approach. The latency introduced by the threshold still depend on how quickly data packets accumulate in a coalescing buffer. The hybrid scheme trades off between efficiency and latency. A shorter time interval reduces latency but also limits coalescing opportunities. A higher threshold improves efficiency but can increase latency in low-traffic scenarios.

Figure 4:
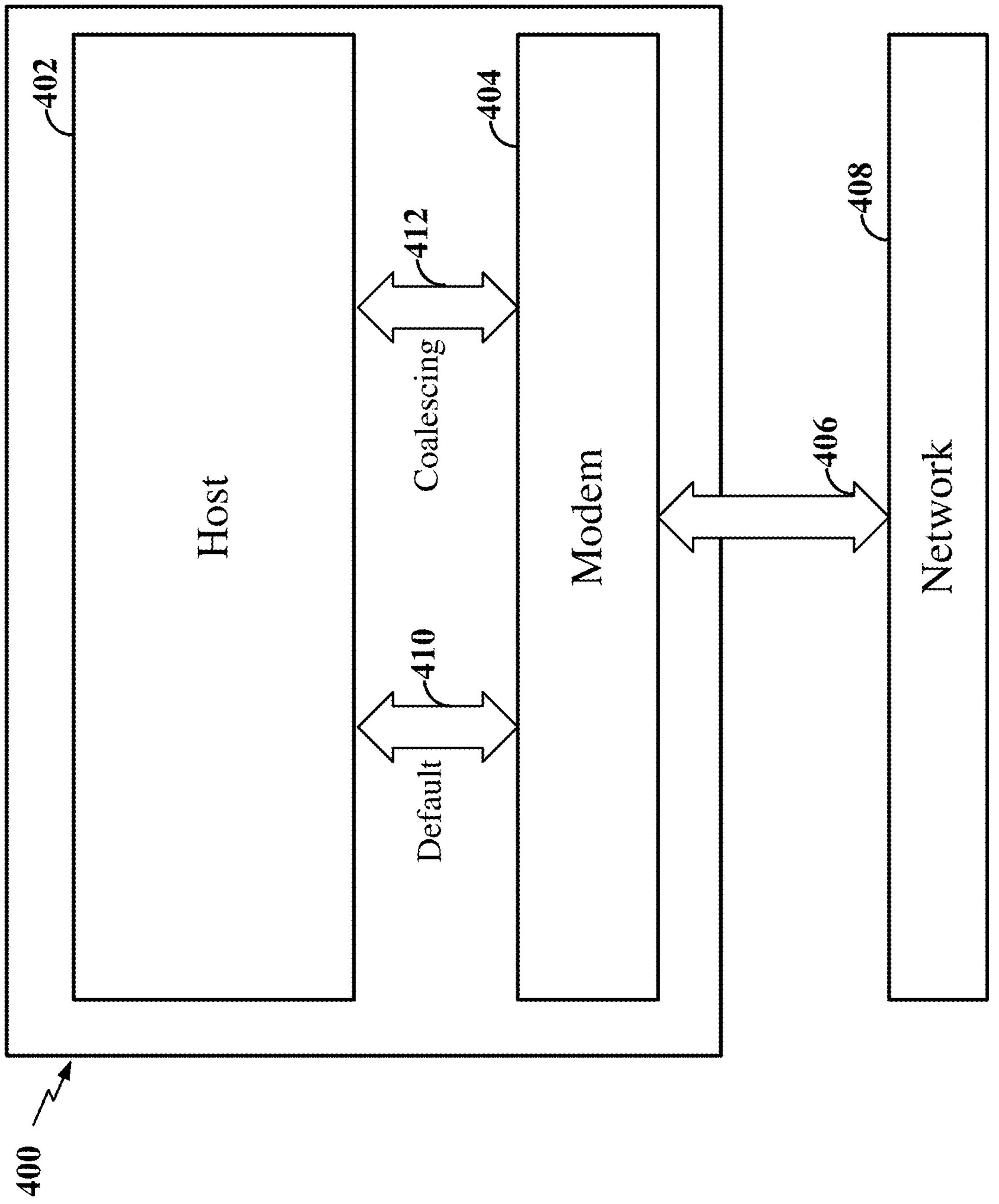
FIG. 4 is a block diagram illustrating an apparatus with a modem according to some aspects.

Some aspects of the disclosure provide techniques for coalescing data packets based on a coalescing efficiency ($C_e$) that can be dynamically determined. FIG. 4 is a diagram illustrating a communication apparatus 400 with a modem 404 according to some aspects of the disclosure. The apparatus 400 can be any of the devices or a part of the devices (e.g., UE or network entity) described above in relation to FIGS. 1 and 2. The apparatus 400 includes a host 402 and a modem 404. In one example, the host 402 may be the CPU 204 of FIG. 2. The modem 404 can provide a means for the host to send and receive data 406 to and from a network 408 (e.g., wireless network, Internet, etc.). The host 402 and the modem 404 can be connected by one or more data channels, for example, a first channel 410 and a second channel 412. These channels can provide the logical channels or data pipes that the modem uses to manage and differentiate different types of traffic. These channels enable multiple flows of data (e.g., from different applications, services, or slices) to be handled separately or aggregated for more efficient transmission. In some aspects, the apparatus 400 can use the first channel 410 as the general-purpose channel for most data transmission and default data traffic (e.g., non-coalesced data). The apparatus can use the second channel 412 for control traffic or special data flows. In one example, the apparatus can use the second channel 412 for coalesced data traffic.

Figure 5:
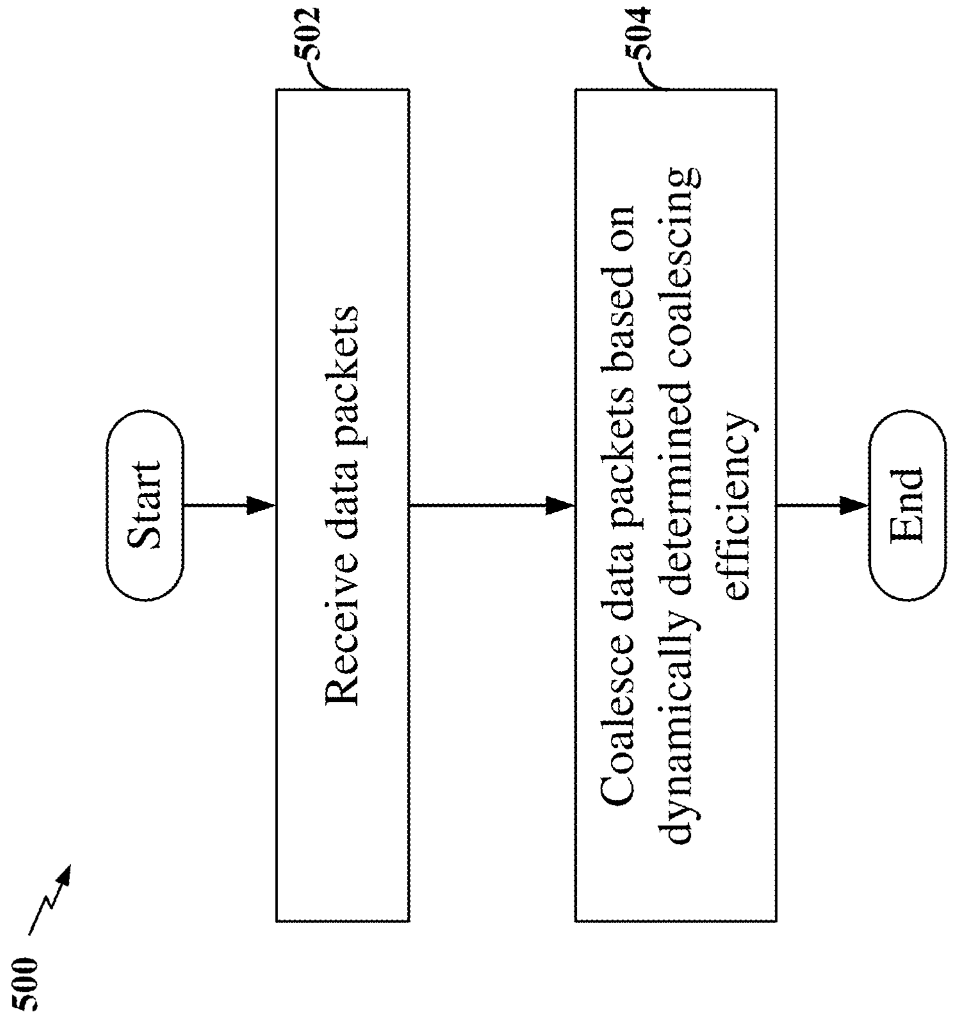
FIG. 5 is a diagram illustrating an exemplary process of coalescing data packets based on coalescing efficiency according to some aspects.

FIG. 5 is a diagram illustrating a process 500 of coalescing data packets based on $C_e$ according to some aspects of the disclosure. For example, the apparatus 400 of FIG. 4 can use the process 500 to coalescing data packets at a modem. At 502, a device (e.g., modem 404 of FIG. 4) can receive one or more data packets (e.g., downlink packets, IP packets) from another device or a network (e.g., a wireless or wired network). For example, the data packets can be IP packets. At 504, the device can coalesce the received data packets into a coalesced frame (e.g., coalesced frame 300 of FIG. 3) based on coalescing efficiency $C_e$. The processes of receiving data packets, calculating $C_e$, and coalescing data packets can be ongoing processes to dynamically determine the $C_e$. In some cases, these processes can overlap at least partially in time.

In some aspects, the device can calculate $C_e$ using equations (1) and (2) shown below:

$$\text{Coalescing factor } C_f = (N/N_{max}) * (L/L_{max}) * (T_{min}/T^{1/3}) \quad \text{(Equation 1)}$$

$$\text{Coalescing efficiency } C_e = C_f * 100\%, \quad \text{(Equation 2)}$$

where N is the number of data packets in a coalesced frame, $N_{max}$ is the maximum number of data packets in a coalesced frame, L is the size of a coalesced frame, $L_{max}$ is the maximum size of a coalesced frame, T is the time used for coalescing data packets, and $T_{min}$ is the minimum time for coalescing data packets In one example, the value of N can be an integer between 1 and 44, inclusive (i.e., $1 \le N \le 44$); the value of L can be any value greater than 0, up to and including 64K bytes (i.e., $0 < L \le 64$K bytes); and T can be an integer between 1 and 3, inclusive (e.g., 3 ms). In other examples, N, L, and T can have other limits in various implementations and designs.

In some aspects, based on $C_e$, the device (e.g., modem 404 of FIG. 4) can reduce the latency of sending the received data packets (e.g., downlink data) to the host (e.g., host 402 of FIG. 4) using one or more of the following techniques: reducing the time limit of coalescing, disabling coalescing data packets and sending the packets independently on a coalescing channel (e.g., second channel 412 of FIG. 4), or sending the data packets to the host through a default channel or non-coalescing channel (e.g., first channel 410 of FIG. 4) instead of the coalescing channel.

FIG. 6 is a diagram illustrating an exemplary header format 600 of a coalesced frame according to some aspects of the disclosure. In one example, the header format 600 may be used for the frame header 304 of FIG. 3. A device can use the header format to encapsulate multiple individual packets within a coalesced frame (e.g., coalesced frame 300 of FIG. 3). The header can provide information that help the device to distinguish between different packet flows, services, and slices, allowing multiple types of data (such as internet traffic, control signals, or voice data) to be coalesced into a single frame. The header can have a fixed size (e.g., 32 Bytes).

The header can include a frame length field 602 that indicates the full coalesced frame's length and can include padding and any coalesced bad TCP checksum segments.

The header can include a MUX ID field 604 (e.g., within the range of 0x70 to 0x7E) for sending Mobile Broadband Interface Model (MBIM) traffic over PCIe. A distinct MUX ID can be used for each packet data network. The header can include command and data (C/D) 606 field that is set to a value (e.g., "D" or 0) to indicate that the coalesced packet is an IP packet. In some aspects, non-IP packets are not coalesced. The header can include a next header field 608 and header type field 610. The next header field and the header type field can be set to indicate a coalescing header and no further header. The header can include a padding field 611 that is set to "0" to indicate no padding. The header can include an NL field 612 that indicates a number of valid pairs of "packet length" 614 and "number of packets" 616 included in the header. The NL field can be set to 1 to indicate no coalescing. A coalescing frame is closed when the NL field 612 indicates the maximum number of valid pairs of "packet length" and "number of packets." For example, the header format 600 can coalesce up to six different pairs of "packet length" and "number of packets." The header can include a checksum valid field 618 that is set when all coalesced packets have a valid transport layer checksum, or not set when at least one packet has a bad transport layer checksum. The header can include a virtual channel/context Id field 620 that can identify the virtual channel or coalescing context. Virtual channels enable multiple logical data streams to share a single physical communication link.

The header can include a global checksum error bitmap 622 that identifies which packet has a bad transport layer checksum. In some examples, a coalescing frame can include up to 48 coalesced packets. The checksum error bitmaps 622 (e.g., 48 bits) can be directly mapped to the packets coalesced in current frame, irrespective of which pair of "packet length" and "number of packets" that the packets belong. The checksum error bitmap 622 can be viewed as one contiguous 48-bit field, which is physically spread out across the frame header as multiple bitmaps 622. The packet length field 624 and the number of packets field 626 enable up to 48 packets of the same length to be coalesced. The number of packets field can be between 1 and 48. The packet length field 624 indicates the packet length of a coalesced packet.

In some aspects, there are various types of reasons that can trigger the closure of the coalescing process of a coalesced frame. The closure reason can depend on predefined conditions such as time, buffer size, or error states. For example, the types of reasons for closing a coalesced frame can include coalesced frame size limit, packet limit, time limit, etc. In some aspects, the header format can include a close value field 630 and a close type field 632. The close value field 630 and the close type field 632 can provide information about the closing type and reasons of the coalesced frame. For example, the close type field 632 can indicate that a coalesced frame is closed for reaching one or more predefined limits, and the close value field 630 can indicate the specific limit that caused the closure of the coalesced frame.

In some aspects, the close type field 632 can indicate information relating to when to stop or close the coalescing operation. For example, type 0 for a non-coalesceable packet, type 1 for IP layer mismatch, type 2 for transport layer mismatch, type 3 for hardware closure, and type 4 for consecutively coalesceable packets that are exhausted in a coalesced frame, coalescing process would be stopped. In case of type 3, the close value field 630 can use the value "0" to indicate NL limit, the value "1" to indicate packet limit, the value "2" to indicate byte limit, the value "3" to indicate time limit/force close, and the value "4" to indicate eviction.

In a first example, the close type field 632 and close value field 630 can indicate that the coalesced frame reached its maximum allowed frame size. In this case, the device can buffer enough individual packets to reach the specified limit (e.g., 64 KB). Once the frame size reaches this threshold, coalescing stops, and the coalesced frame can be sent. In a second example, the close type field 632 and close value field 630 can indicate that the predefined time limit (e.g., a 3 ms window) for coalescing expired before the buffer was full. Once the time window expires, the device closes the buffer and sends the coalesced frame, even if the buffer is not completely filled (e.g., 44 KB out of 64 KB buffer filled). In a third example, the close type field 632 and close value field 630 can indicate that the frame contained the maximum number of data packets that can be included in a coalesced frame. The device can be configured to close the frame after a certain number of individual packets are grouped. In this case, the device can close and send the coalesced frame, even if the buffer limit or time limit has not been reached.

Figure 7:
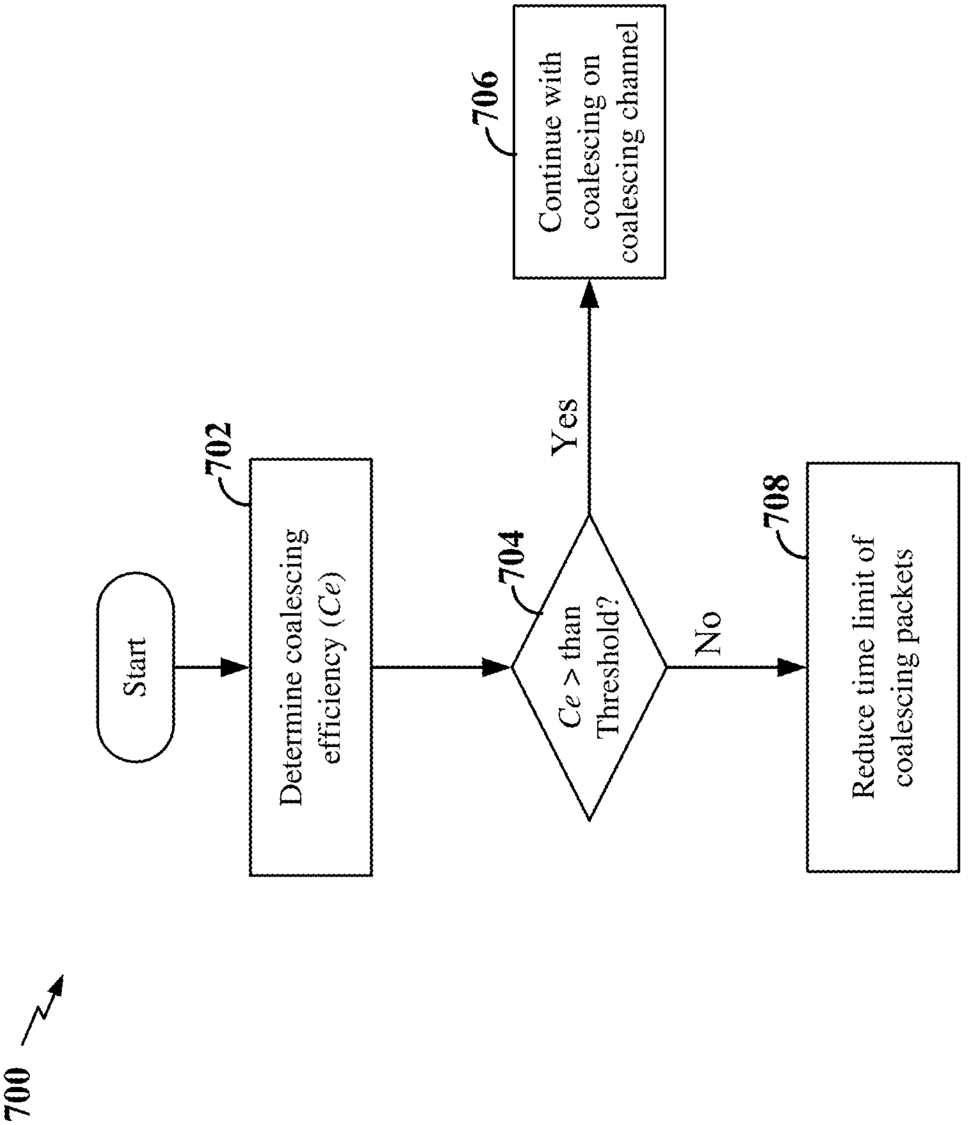
FIG. 7 is a diagram illustrating a first process of coalescing data packets based on coalescing efficiency according to some aspects.

FIG. 7 is a diagram illustrating a process 700 of coalescing data packets based on $C_e$ according to some aspects of the disclosure. The process 700 can be performed by any of the devices described above in relation to FIGS. 1, 2, and 4. For example, the process 700 can be performed by a UE, a network entity, or any communication device.

At 702, a device (e.g., a UE or a network entity) can dynamically determine the coalescing efficient Ce, for example, using equations (1) and (2). In some examples, the device can calculate or update $C_e$ for every X number of consecutive coalesced frames (e.g., X is 1 or more). In some aspects, the device can check the header of the last coalesced frame to determine the value of the parameters (e.g., L and N) used in equation (1). In one example, the header (e.g., header 600 of FIG. 6) of a coalesced frame can indicate that the length of a data packet is 1500 bytes, the number of packets (N) is 44 packets, and therefore the coalesced frame length is about 64 bytes. In one example, the parameters $N_{max}$, $L_{max}$, $T_{min}$ can have the following values: $N_{max}$=44 packets, $L_{max}$=64K bytes, and $T_{min}$=1 ms. Therefore, $C_e$ is 100% for T=1 ms, $C_e$ is about 79.4% for T=2 ms, and $C_e$ is about 69.3% for T=3 ms.

At 704, the device can decide whether or not $C_e$ is greater than a predetermined threshold. In one example, the predetermined threshold of $C_e$ can be 10%. Therefore, for all cases of T equal to 1 ms, 2 ms, and 3 ms, $C_e$ is greater than the predetermined threshold. In other examples, the predetermined threshold of $C_e$ can have other desired values.

At 706, if $C_e$ is greater than or equal to the threshold (Yes branch in FIG. 7), the device can continue with the current coalescing process. Otherwise, at 708, if $C_e$ is less than the threshold (NO branch in FIG. 7), the device can reduce the coalescing time limit T for coalescing packets. Reducing T reduces coalescing latency because the device closes a coalesced frame earlier. In this example, the device can maintain the current coalescing on the coalescing channel with T set to 3 ms because $C_e$ is greater than the threshold (e.g., 10%).

In another example, the header of a coalesced frame can indicate that length of each packet is 1500 bytes, the number of packets (N) is 16 packets, and the coalesced frame length is about 23 kilobytes. Therefore, $C_e$ is about 13% for T=1 ms, $C_e$ is about 10.3% for T=2 ms, and $C_e$ is about 9.01% for T=3 ms. In this case, $C_e$ is less than the threshold when T is greater than 2 ms (i.e., 3 ms). Therefore, device can reduce the coalescing time limit from 3 ms to 2 ms.

Figure 8:
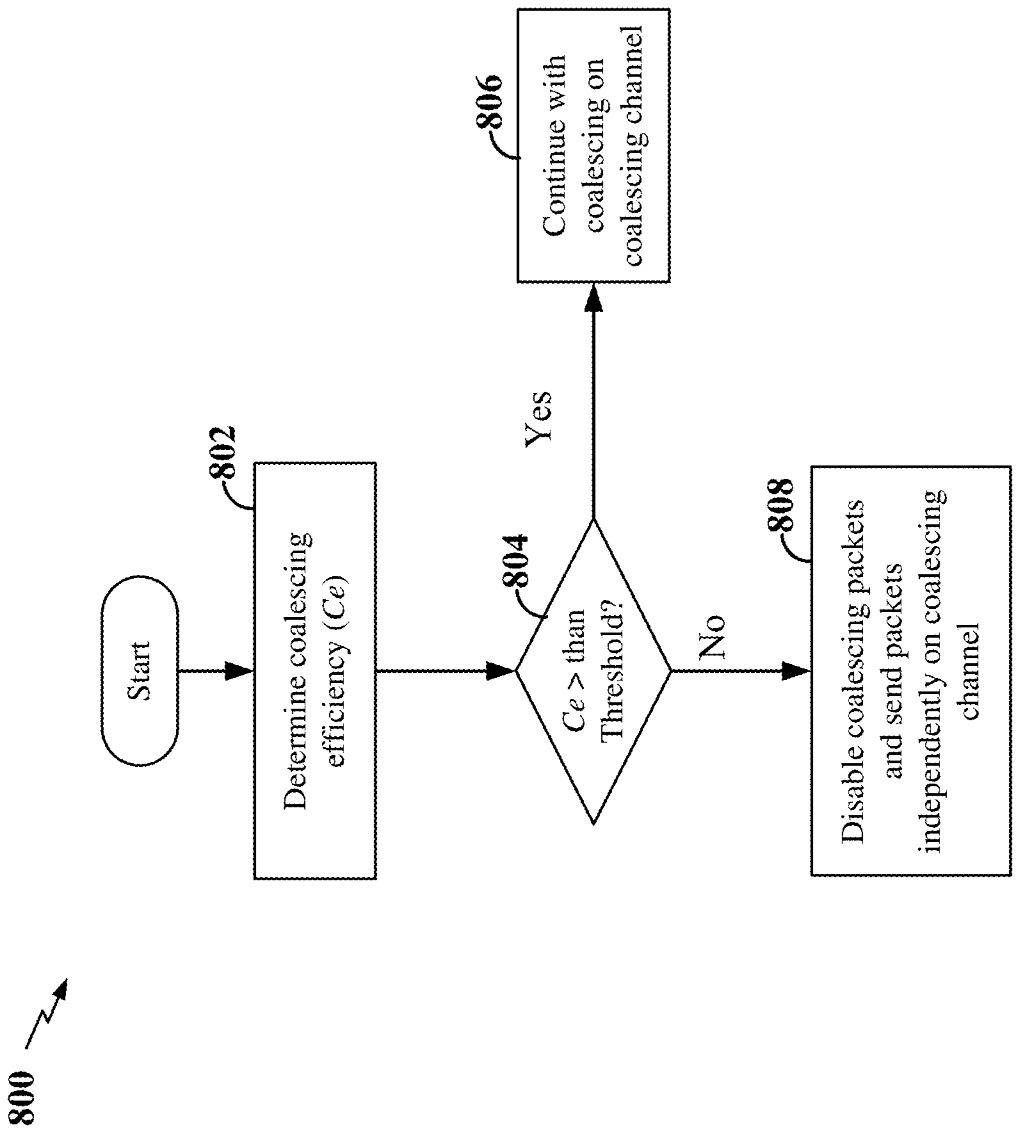
FIG. 8 is a diagram illustrating a second process of coalescing data packets based on coalescing efficiency according to some aspects.

FIG. 8 is a diagram illustrating another process 800 of coalescing data packets based on $C_e$ according to some aspects of the disclosure. The process 800 can be performed by any of the devices described above in relation to FIGS. 1, 2, and 4. For example, the process 800 can be performed by a UE, a network entity, or any communication devices.

At 802, a device (e.g., a UE or a network entity) can dynamically determine the coalescing efficient $C_e$, for example, using equations (1) and (2). In some examples, the device can calculate or update $C_e$ for every X number of consecutive coalesced frames (e.g., X is 1 or more). In some aspects, the device can check the header of the last coalesced frame to determine the value of the parameters (e.g., L and N) used in equation (1). In one example, the header (e.g., header 600 of FIG. 6) can indicate that length L of each packet is 1500 bytes, the number of packets (N) is 44 packets, and the coalesced frame length is about 64 bytes. In this case, the parameters $N_{max}$, $L_{max}$, $T_{min}$ can have the following values: $N_{max}$=44 packets, $L_{max}$=64K bytes, and $T_{min}$=1 ms. Therefore, $C_e$ is 100% for T=1 ms, $C_e$ is about 79.4% for T=2 ms, and $C_e$ is about 69.3% for T=3 ms.

At 804, the device can decide whether or not $C_e$ is greater than a predetermined threshold. For example, the device can set the predetermined threshold of $C_e$ to be 10%. In other examples, the predetermined threshold of $C_e$ can have other desired values.

At 806, if $C_e$ is greater than or equal to the threshold (Yes branch in FIG. 8), the device can continue with the current coalescing process and send the coalesced frame on the coalescing channel. Otherwise, at 808, if $C_e$ is less than the threshold (NO branch in FIG. 8), the device can disable coalescing packets and send the data packets independently on the coalescing channel.

In another example, the header of the coalesced frame can indicate that length of each packet is 1500 bytes, the number of packets (N) is 16 packets, and the coalesced frame length is about 23 kilobytes. Therefore, $C_e$ is about 13% for T=1 ms, $C_e$ is about 10.3% for T=2 ms, and $C_e$ is about 9.01% for T=3 ms. In this case, $C_e$ is less than the threshold when Tis greater than 2 ms. Therefore, when Tis set to 2 ms or 1 ms, the device can continue with coalescing packets. When T is set to 1 ms, the device can disable coalescing packets and send the packets independently on the coalescing channel.

Figure 9:
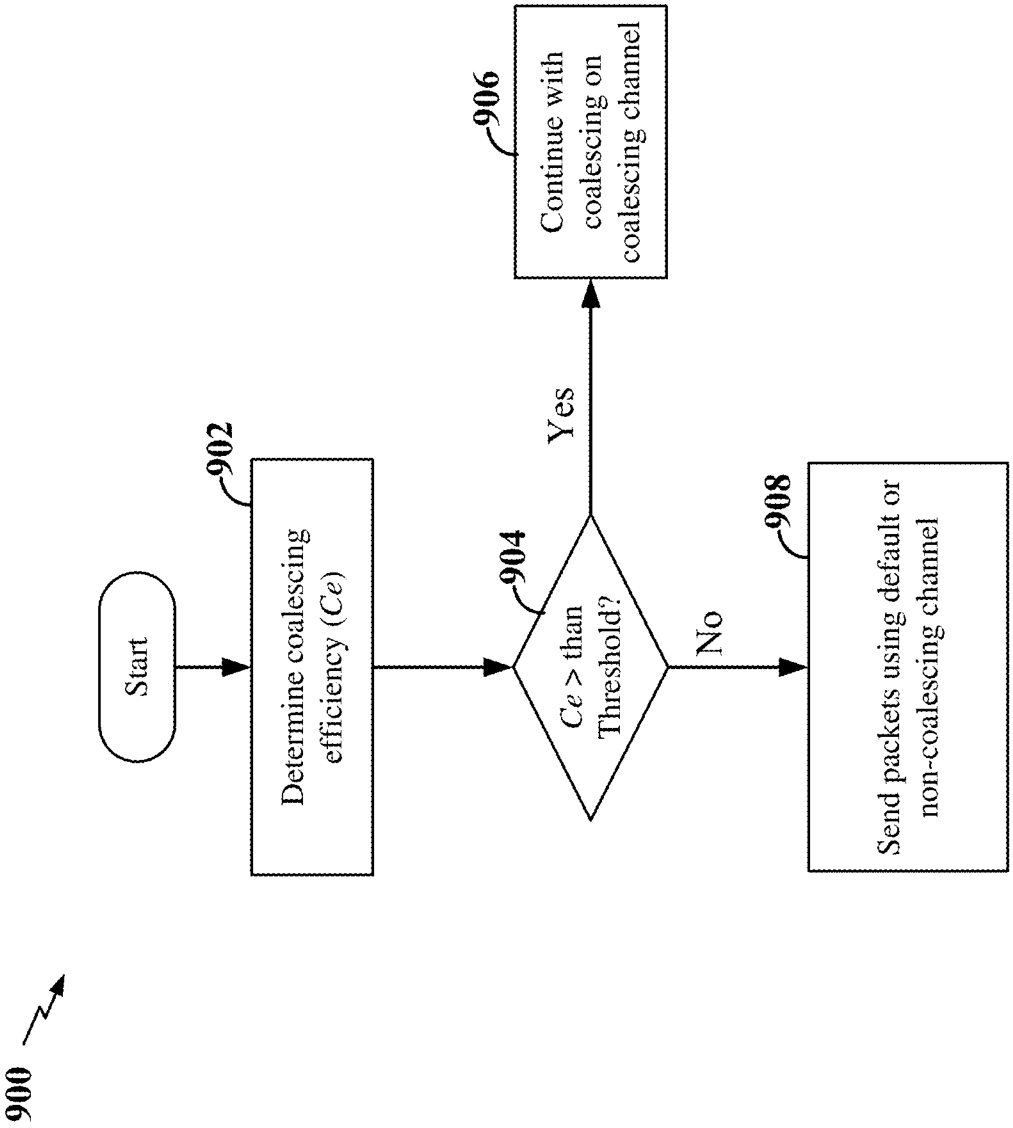
FIG. 9 is a diagram illustrating a third process of coalescing data packets based on coalescing efficiency according to some aspects.

FIG. 9 is a diagram illustrating yet another process 900 of coalescing data packets based on $C_e$ according to some aspects of the disclosure. The process 900 can be performed by any of the devices described above in relation to FIGS. 1, 2, and 4. For example, the process 900 can be performed by a UE, a network entity, or any communication devices.

At 902, a device (e.g., a UE or a network entity) can determine the coalescing efficient $C_e$, for example, using equations (1) and (2). In some examples, the device can calculate or update $C_e$ for every X number of consecutive coalesced frames (e.g., X is 1 or more). In some aspects, the device can check the header of the last coalesced frame to determine the value of the parameters (e.g., L and N) used in equation (1). In one example, the header (e.g., header 600 of FIG. 6) can indicate that length of each packet is 1500 bytes, the number of packets (N) is 44 packets, and the coalesced frame length is about 64 kilobytes. In this case, the parameters $N_{max}$, $L_{max}$, $T_{min}$ can have the following values: $N_{max}$=44 packets, $L_{max}$=64K bytes, and $T_{min}$=1 ms. Therefore, $C_e$ is 100% for T=1 ms, $C_e$ is about 79.4% for T=2 ms, and $C_e$ is about 69.3% for T=3 ms.

At 904, the device can decide whether or not $C_e$ is greater than the predetermined threshold. For example, the device can set the predetermined threshold of $C_e$ to be 10%. In all three cases (T=1, 2, or 3), $C_e$ is greater than the threshold of 10%. In other examples, the predetermined threshold of $C_e$ can have other desired values.

At 906, if $C_e$ is greater than or equal to the threshold (Yes branch in FIG. 9), the device can continue with the current coalescing process. Otherwise, at 908, if $C_e$ is less than the threshold (NO branch in FIG. 9), the device can send the packets independently (no coalescing) on the default or non-coalescing channel. In this case, instead of switching the channel, the same coalesced channel can be used with coalescing disabled (when $C_e$ falls below threshold). When $C_e$ falls below the threshold, whether to send the packets independently (no coalescing) using the default channel or coalescing channel can be implementation specific.

In another example, the header can indicate that length of each packet is 1500 bytes, the number of packets (N) is 16 packets, and the coalesced frame length is about 23 kilobytes. Therefore, $C_e$ is about 13% for T=1 ms, $C_e$ is about 10.3% for T=2 ms, and $C_e$ is about 9.01% for T=3 ms. In this case, $C_e$ is less than the threshold when Tis 3 ms. Therefore, when T is set to 2 ms or 1 ms, the device can continue with coalescing packets. When T is set to 3 ms, the device can send the packets independently on the default or non-coalescing channel.

In some aspects, the device can use one or more of the processes 700, 800, and 900 described above in relation to FIGS. 7-9 to coalesce data packets based on Ce. In some aspects, the device can determine the coalescing factor $C_f$ using equation (3) instead of equation (1).

$$C_f = (N/N_{max}) * (L/L_{max}) * (t_{min}/t) \quad \text{(Equation 3)}$$

In equation (3), t is a real value of time limit for coalescing packets.

In some aspects, the device can determine the coalescing factor $C_f$ in consideration of the service slice associated with the data packets. For example, in 5G NR, a service slice is a feature that enables the use of multiple virtual networks on top of a shared physical network infrastructure. Each slice can be tailored to meet specific service requirements, such as latency, bandwidth, reliability, and security, providing different levels of performance and features to different users or applications. Some examples of service slices are enhanced Mobile Broadband (eMBB), Ultra-Reliable Low-Latency Communication (URLLC), and massive Machine-Type Communication (mMTC). The eMBB slice can provide high data rates for applications like video streaming, gaming, and virtual reality. The URLLC slice can enable mission-critical applications that require very low latency and high reliability, such as autonomous driving, remote surgery, or industrial automation. The mMTC slice can be optimized for handling a large number of connected devices, such as Internet of Things (IoT) sensors, with lower data rates and less stringent latency requirements.

In some aspects, the device can determine the coalescing factor $C_f$ using equation (4) instead of equation (1).

$$C_f = S * (N/N_{max}) * (L/L_{max}) * (T_{min}/T) \quad \text{(Equation 4)}$$

In equation (4), S is a parameter that can be set to various values based on the service slice type, for example: S=1 for eMBB and mMTC service slices and S=X for URLLC. For example, X=floor ($T^{-1}$) (T can be an integer between 1 ms and 3 ms, inclusive). Therefore, for URLLC slice, S=1 for T≤1; and S=0 for T>1. That is, for S=0, $C_f$ automatically becomes 0 irrespective of the values of N and L. In one example, the header can indicate that the length of each packet is 1500 bytes, the number of packets (N) is 44 packets, and the coalesced frame length is about 64 kilobytes. Therefore, using equations (2) and (4), $C_e$ is 100% for T=1 ms, $C_e$ is 0% for T=2 ms or 3 ms (as S=0).

Figure 10:
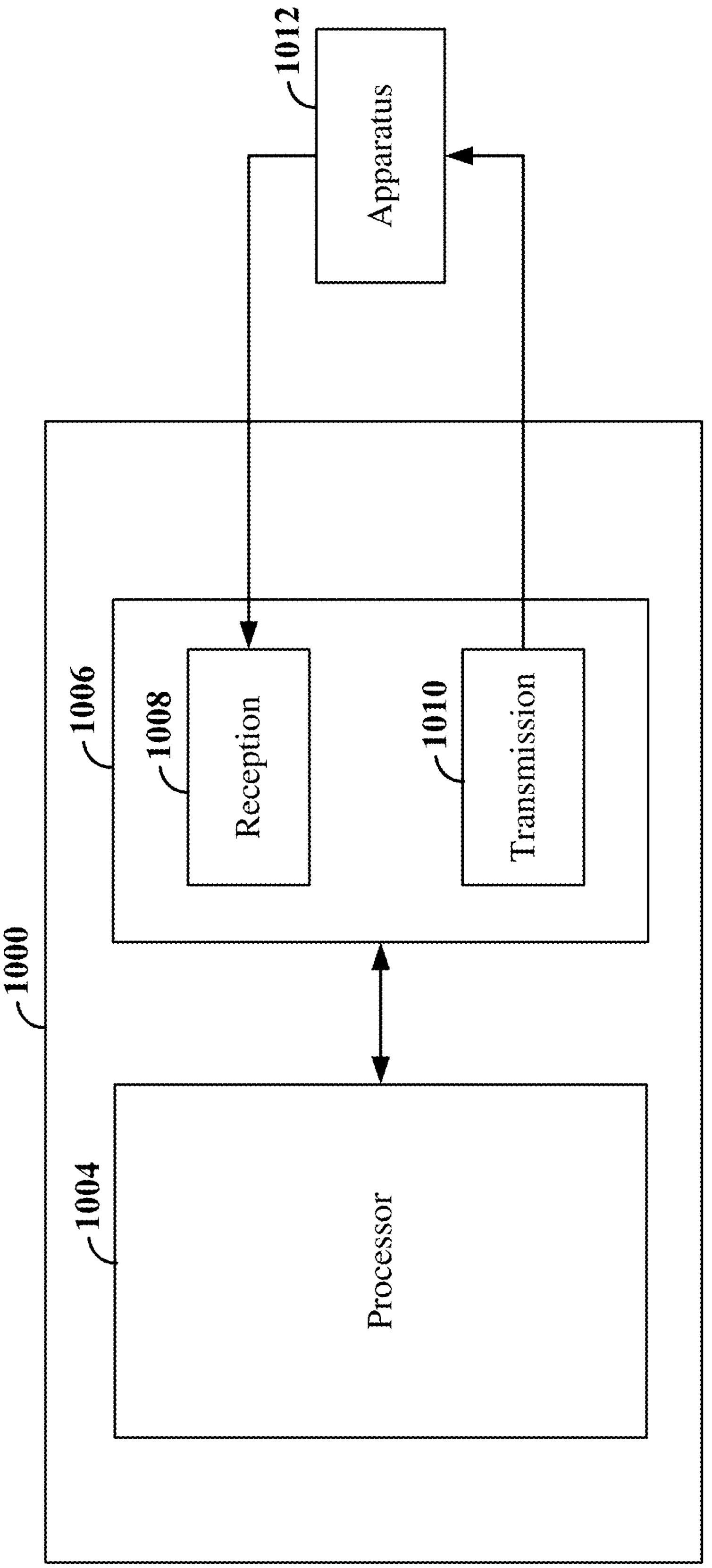
FIG. 10 is a block diagram illustrating an example of a communication apparatus according to some aspects.

FIG. 10 is a diagram of an exemplary communication apparatus 1000 for data [0100] communication using a coalesced frame according to some aspects of the present disclosure. The apparatus 1000 can be any of the devices (e.g., UE or network entity) of FIGS. 1, 2, and 4. In some aspects, the apparatus 1000 includes one or more processors (e.g., a processor 1004) and a communication circuitry 1006. In one example, the communication circuitry 1006 can include a reception component 1008 and a transmission component 1010. In one example, the communication circuitry 1006 can be a modem or a portion of a modem. The communication circuitry 1006 can communicate with the processor 1004, for example, via one or more buses or signal lines. As shown, the apparatus 1000 can communicate with another apparatus 1012 (e.g., a UE, a network entity, or another wireless communication device) using the communication circuitry 1006 (e.g., using the reception component 1008 and/or the transmission component 1010).

In some aspects, the communication apparatus 1000 can be configured to perform one or more operations described herein in connection with FIGS. 1-9. Additionally or alternatively, the apparatus 1000 can be configured to perform one or more processes described herein, such as process 1100 of FIG. 11. For example, the apparatus 1000 can coalesce packets based on coalescing efficiency Ce using the processes described in FIGS. 1-9 and 11.

The reception component 1008 can receive communications, such as reference signals, control information, data communications, or a combination thereof, from the apparatus 1012. The reception component 1008 can provide received communications to one or more other components of the apparatus 1000, such as the processor 1004. In some aspects, the reception component 1008 can perform signal processing on the received communications (such as filtering, amplification, demodulation, analog-to-digital conversion, demultiplexing, deinterleaving, de-mapping, equalization, interference cancellation, or decoding, among other examples), and can provide the processed signals to the one or more other components. In some aspects, the reception component 1008 and the processor 1004 can include one or more antennas, a demodulator, a receive processor, a controller/processor, a memory, or a combination thereof, of the devices described above in connection with FIGS. 1, 2, and 4.

The transmission component 1010 can transmit communications, such as reference signals, control information, data communications, or a combination thereof, to the apparatus 1012. In some aspects, the processor 1004 can generate communications and can transmit the generated communications to the transmission component 1010 for transmission to the apparatus 1012. In some aspects, the transmission component 1010 can perform signal processing on the generated communications (such as filtering, amplification, modulation, digital-to-analog conversion, multiplexing, interleaving, mapping, or encoding, among other examples), and can transmit the processed signals to the apparatus 1012. In some aspects, the transmission component 1010 can include one or more antennas, a modem, a modulator, a transmit MIMO processor, a transmit processor, a controller/processor, a memory, or a combination thereof, of the devices described above in connection with FIGS. 1, 2 and 4. In some aspects, the transmission component 1010 can be co-located with the reception component 1008 in a transceiver.

The processor 1004 can include one or more processors, one or more memories, a scheduler, a communication unit, or a combination thereof, of the devices described above in connection with FIGS. 1, 2 and 4. In some aspects, the processor 1004 includes a set of components, for example, any of the components of the devices described above in connection with FIGS. 2 and 4. Additionally or alternatively, one or more components can be implemented at least in part as software stored in a memory. For example, a component (or a portion of a component) can be implemented as instructions or code stored in a non-transitory computer-readable medium and executable by a controller or a processor to perform the functions or operations of the component.

In some aspects, the processor 1004 can determine the coalescing efficiency of the communication apparatus 1000 and adjust a coalescing process of a plurality of data packets based on the determined coalescing efficiency.

The number and arrangement of components shown in FIG. 10 are provided as an example. In practice, there can be additional components, fewer components, different components, or differently arranged components than those shown in FIG. 10. Furthermore, two or more components shown in FIG. 10 can be implemented within a single component, or a single component shown in FIG. 10 can be implemented as multiple, distributed components. Additionally or alternatively, a set of (one or more) components shown in FIG. 10 can perform one or more functions described as being performed by another set of components shown in FIG. 10.

Figure 11:
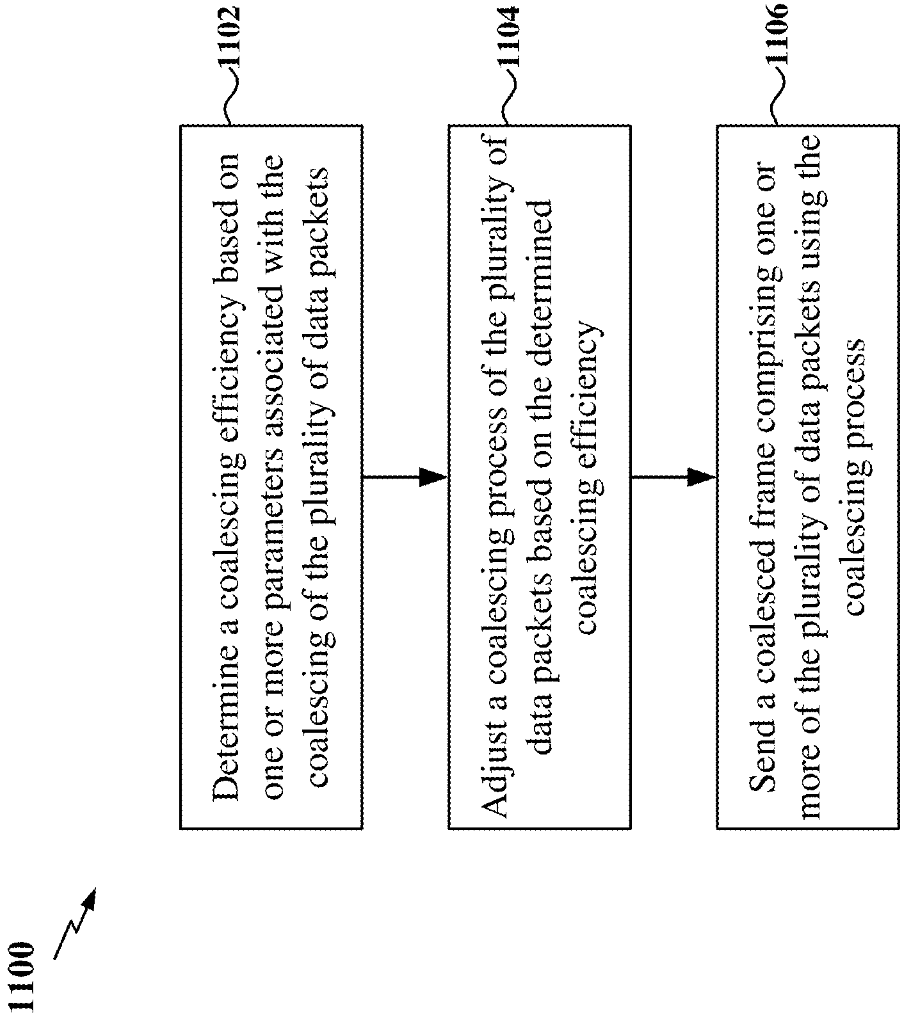
FIG. 11 is a flow chart of an exemplary process for coalescing data packet according to some aspects.

FIG. 11 is a flow chart of an exemplary process 1100 for coalescing data packet at an apparatus according to some aspects. As described below, some or all illustrated features can be omitted in a particular implementation within the scope of the present disclosure, and some illustrated features may not be required for implementation of all examples. In some aspects, the process can be performed by the communication apparatus 1000, as described above and illustrated in FIG. 10, by one or more processors or processing system, or by any suitable means for carrying out the described functions. In one example, the apparatus can be a modem.

At 1102 the apparatus can determine the coalescing efficiency based on one or more parameters associated with the coalescing of a plurality of data packets. For example, the apparatus can use one or more of the coalescing equations (1), (3), (4) and (2) described above to determine the coalescing efficiency. The one or more parameters can include the number (N) of packets in a coalesced frame, maximum number ($N_{max}$) of packets in a coalesced frame, size (L) of a coalesced frame, maximum size ($L_{max}$) of a coalesced frame, time limit (T) for packet coalescing, and minimum time ($T_{min}$) for packet coalescing. In some aspects, the processor 1004 and/or communication circuitry 1006 can provide a means to determine the coalescing efficiency.

At 1104, the apparatus can adjust a coalescing process of the plurality of data packets based on the determined coalescing efficiency. In one aspect, the apparatus can use the process 700 of FIG. 7 to adjust the coalescing process of data packets. For example, the apparatus can reduce the time limit of coalescing packets based on the coalescing efficiency. In one aspect, the apparatus can use the process 800 of FIG. 8 to adjust the coalescing process of data packets. For example, the apparatus can disable coalescing packets and send the data packets independently on the coalescing channel (e.g., channel 412 of FIG. 4). In one aspect, the apparatus can use the process 900 of FIG. 9 to adjust the coalescing process of data packets. For example, the apparatus can send the data packets (without coalescing) using a default or non-coalescing channel based on the coalescing efficiency. In some aspects, the processor 1004 and/or communication circuitry 1006 can provide a means to adjust the coalescing process of packets based on the determined coalescing efficiency.

At 1106, the apparatus can send a coalesced frame including one or more of the plurality of data packets using the coalescing process. In one example, the reception component 1008 and/or processor 1004 can provide a means to send the coalesced frame to a host (e.g., processor 1004 of FIG. 10). The coalesced frame can include one or more of the plurality of data packets.

In some aspects, the apparatus (e.g., processor 1004 of FIG. 10) can be further configured to determine a coalescing time limit for the coalescing of the plurality of data packets; reduce the coalescing time limit from a first duration to a second duration in response to the coalescing efficiency being less than a predetermined threshold; and transmit a coalesced frame including one or more of the plurality of data packets after the expiration of the reduced coalescing time limit.

In some aspects, the apparatus can be further configured to disable coalescing of the plurality of data packets in response to the coalescing efficiency being less than a predetermined threshold; and send the plurality of data packets independently in a coalescing channel.

In some aspects, the apparatus can be further configured to disable coalescing of the plurality of data packets in response to the coalescing efficiency being less than a predetermined threshold; and send the plurality of data packets in a non-coalescing channel.

In some aspects, the apparatus can be further configured to determine the coalescing efficiency based on a number (quantity) of packets in the coalesced frame, a size of the coalesced frame, and a time limit for coalescing the coalesced frame.

In some aspects, the apparatus can be further configured to determine the coalescing efficiency based on a service slice associated with the plurality of data packets.

In some aspects, the coalescing efficiency can be directly proportional to the [0116] number of packets and the size of the coalesced frame, and inversely proportional to the time limit.

In some aspects, the coalescing efficiency can be inversely proportional to a cube root of the time limit.

The following provides an overview of examples of the present disclosure.

Aspect 1: An apparatus for wireless communication, comprising: communication circuitry; and one or more processors coupled to the communication circuitry; wherein the one or more processors are configured to: determine a coalescing efficiency based on one or more parameters associated with coalescing of a plurality of data packets received at the communication circuitry; adjust a coalescing process of the plurality of data packets based on the determined coalescing efficiency;

and send, via the communication circuitry, a coalesced frame comprising one or more of the plurality of data packets using the coalescing process.

Aspect 2: The apparatus of aspect 1, wherein the one or more processors are further configured to: determine a coalescing time limit for coalescing of the plurality of data packets; reduce the coalescing time limit from a first duration to a second duration in response to the coalescing efficiency being less than a predetermined threshold; and send the coalesced frame comprising one or more of the plurality of data packets after expiration of the reduced coalescing time limit.

Aspect 3: The apparatus of aspect 1, wherein the one or more processors are further configured to: disable coalescing of the plurality of data packets in response to the coalescing efficiency being less than a predetermined threshold; and send the plurality of data packets independently using a coalescing channel.

Aspect 4: The apparatus of aspect 1, wherein the one or more processors are further configured to: disable coalescing of the plurality of data packets in response to the coalescing efficiency being less than a predetermined threshold; and send the plurality of data packets using a non-coalescing channel.

Aspect 5: The apparatus of aspect 1, 2, 3, or 4, wherein the one or more processors are further configured to: determine the coalescing efficiency based on a quantity of packets in the coalesced frame, a size of the coalesced frame, and a time limit for coalescing the plurality of data packets.

Aspect 6: The apparatus of aspect 5, wherein the one or more processors are further configured to: determine the coalescing efficiency based on a service slice associated with the plurality of data packets.

Aspect 7: The apparatus of aspect 5, wherein the coalescing efficiency is directly proportional to the quantity of packets and the size of the coalesced frame, and is inversely proportional to the time limit.

Aspect 8: The apparatus of aspect 5, wherein the coalescing efficiency is inversely proportional to a cube root of the time limit.

Aspect 9: A method for data communication at an apparatus, the method comprising: determining a coalescing efficiency based on one or more parameters associated with coalescing of a plurality of data packets received at the apparatus; adjusting a coalescing process of the plurality of data packets based on the determined coalescing efficiency; and sending a coalesced frame comprising one or more of the plurality of data packets using the coalescing process.

Aspect 10: The method of aspect 9, further comprising: determining a coalescing time limit for coalescing of the plurality of data packets; reducing the coalescing time limit from a first duration to a second duration in response to coalescing efficiency being less than a predetermined threshold; and sending the coalesced frame comprising one or more of the plurality of data packets after expiration of the reduced coalescing time limit.

Aspect 11: The method of aspect 9, further comprising: disabling coalescing of the plurality of data packets in response to the coalescing efficiency being less than a predetermined threshold; and sending the plurality of data packets independently using a coalescing channel.

Aspect 12: The method of aspect 9, further comprising: disabling coalescing of the plurality of data packets in response to the coalescing efficiency being less than a predetermined threshold; and sending the plurality of data packets using a non-coalescing channel.

Aspect 13: The method of aspect 9, 10, 11, or 12, further comprising: determining the coalescing efficiency based on a quantity of packets in the coalesced frame, a size of the coalesced frame, and a time limit for coalescing the plurality of data packets.

Aspect 14: The method of aspect 13, further comprising: determining the coalescing efficiency based on a service slice associated with the plurality of data packets.

Aspect 15: The method of aspect 13, wherein the coalescing efficiency is directly proportional to the quantity of packets and the size of the coalesced frame, and is inversely proportional to the time limit.

Aspect 16. The method of aspect 13, wherein the coalescing efficiency is inversely proportional to a cube root of the time limit.

Aspect 17: An apparatus for data communication comprising: mean for determining a coalescing efficiency based on one or more parameters associated with coalescing of a plurality of data packets received at the apparatus; means for adjusting a coalescing process of the plurality of data packets based on the determined coalescing efficiency; and means for sending a coalesced frame comprising one or more of the plurality of data packets using the coalescing process.

Aspect 18: The apparatus of aspect 17, further comprising: means for determining a coalescing time limit for coalescing of the plurality of data packets; means for reducing the coalescing time limit from a first duration to a second duration in response to coalescing efficiency being less than a predetermined threshold; and means for sending the coalesced frame comprising one or more of the plurality of data packets after expiration of the reduced coalescing time limit.

Aspect 19: The apparatus of aspect 17 or 18, further comprising: means for disabling coalescing of the plurality of data packets in response to the coalescing efficiency being less than a predetermined threshold; and means for sending the plurality of data packets independently using a coalescing channel.

Aspect 20: The apparatus of aspect 17 or 18, further comprising: means for disabling coalescing of the plurality of data packets in response to the coalescing efficiency being less than a predetermined threshold; and means for sending the plurality of data packets using a non-coalescing channel.

Several aspects of a wireless communication network have been presented with reference to an exemplary implementation. As those skilled in the art will readily appreciate, various aspects described throughout this disclosure can be extended to other telecommunication systems, network architectures and communication standards.

By way of example, various aspects can be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects can also be extended to systems defined by the 3rd Generation Partnership Project 2 (3GPP2), such as CDMA2000 and/or Evolution-Data Optimized (EV-DO). Other examples can be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word “exemplary” is used to mean “serving as an example, instance, or illustration.” Any implementation or aspect described herein as “exemplary” is not necessarily to be construed as preferred or advantageous over other aspects of the disclosure. Likewise, the term “aspects” does not require that all aspects of the disclosure include the discussed feature, advantage or mode of operation. The term “coupled” is used herein to refer to the direct or indirect coupling between two objects. For example, if object A physically touches object B, and object B touches object C, then objects A and C can still be considered coupled to one another—even if they do not directly physically touch each other. For instance, a first object can be coupled to a second object even though the first object is never directly physically in contact with the second object. The terms “circuit” and “circuitry” are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-11 can be rearranged and/or combined into a single component, step, feature or function or embodied in several components, steps, or functions. Additional elements, components, steps, and/or functions can also be added without departing from novel features disclosed herein. The apparatus, devices, and/or components illustrated in FIGS. 1-11 can be configured to perform one or more of the methods, features, or steps described herein. The novel algorithms described herein can also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods can be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but are to be accorded the full scope consistent with the language of the claims, wherein reference to an element in the singular is not intended to mean “one and only one” unless specifically so stated, but rather “one or more.” Unless specifically stated otherwise, the term “some” refers to one or more. A phrase referring to “at least one of” a list of items refers to any combination of those items, including single members. As an example, “at least one of: a, b, or c” is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication, comprising:
communication circuitry; and
one or more processors coupled to the communication circuitry;
wherein the one or more processors are configured to:
determine a coalescing efficiency based on one or more parameters associated with coalescing of a plurality of data packets received at the communication circuitry;
adjust a coalescing process of the plurality of data packets based on the determined coalescing efficiency, wherein the coalescing efficiency is directly proportional to a quantity of packets and a size of a coalesced frame, and is inversely proportional to a coalescing time limit for coalescing the plurality of data packets; and
send, via the communication circuitry, the coalesced frame comprising one or more of the plurality of data packets using the coalescing process.

2. The apparatus of claim 1, wherein the one or more processors are further configured to:
reduce the coalescing time limit from a first duration to a second duration in response to the coalescing efficiency being less than a predetermined threshold; and
send the coalesced frame comprising one or more of the plurality of data packets after expiration of the reduced coalescing time limit.

3. The apparatus of claim 1, wherein the one or more processors are further configured to:
disable coalescing of the plurality of data packets in response to the coalescing efficiency being less than a predetermined threshold; and
send the plurality of data packets independently using a coalescing channel.

4. The apparatus of claim 1, wherein the one or more processors are further configured to:
disable coalescing of the plurality of data packets in response to the coalescing efficiency being less than a predetermined threshold; and
send the plurality of data packets using a non-coalescing channel.

5. The apparatus of claim 1, wherein the one or more processors are further configured to:
determine the coalescing efficiency based on a service slice associated with the plurality of data packets.

6. The apparatus of claim 1, wherein the coalescing efficiency is inversely proportional to a cube root of the coalescing time limit.

7. A method for data communication at an apparatus, the method comprising:
determining a coalescing efficiency based on one or more parameters associated with coalescing of a plurality of data packets received at the apparatus, wherein the coalescing efficiency is directly proportional to a quantity of packets and a size of a coalesced frame, and is inversely proportional to a coalescing time limit for coalescing the plurality of data packets;
adjusting a coalescing process of the plurality of data packets based on the determined coalescing efficiency; and
sending the coalesced frame comprising one or more of the plurality of data packets using the coalescing process.

8. The method of claim 7, further comprising: reducing the coalescing time limit from a first duration to a second duration in response to coalescing efficiency being less than a predetermined threshold; and sending the coalesced frame comprising one or more of the plurality of data packets after expiration of the reduced coalescing time limit.

9. The method of claim 7, further comprising: disabling coalescing of the plurality of data packets in response to the coalescing efficiency being less than a predetermined threshold; and sending the plurality of data packets independently using a coalescing channel.

10. The method of claim 7, further comprising: disabling coalescing of the plurality of data packets in response to the coalescing efficiency being less than a predetermined threshold; and sending the plurality of data packets using a non-coalescing channel.

11. The method of claim 7, further comprising: determining the coalescing efficiency based on a service slice associated with the plurality of data packets.

12. The method of claim 7, wherein the coalescing efficiency is inversely proportional to a cube root of the coalescing time limit.

13. An apparatus for data communication comprising: mean for determining a coalescing efficiency based on one or more parameters associated with coalescing of a plurality of data packets received at the apparatus, wherein the coalescing efficiency is directly proportional to a quantity of packets and a size of a coalesced frame, and is inversely proportional to a coalescing time limit for coalescing the plurality of data packets; means for adjusting a coalescing process of the plurality of data packets based on the determined coalescing efficiency; and means for sending the coalesced frame comprising one or more of the plurality of data packets using the coalescing process.

14. The apparatus of claim 13, further comprising: means for reducing the coalescing time limit from a first duration to a second duration in response to coalescing efficiency being less than a predetermined threshold; and means for sending the coalesced frame comprising one or more of the plurality of data packets after expiration of the reduced coalescing time limit.

15. The apparatus of claim 13, further comprising: means for disabling coalescing of the plurality of data packets in response to the coalescing efficiency being less than a predetermined threshold; and means for sending the plurality of data packets independently using a coalescing channel.

16. The apparatus of claim 13, further comprising: means for disabling coalescing of the plurality of data packets in response to the coalescing efficiency being less than a predetermined threshold; and means for sending the plurality of data packets using a non-coalescing channel.

* * * * *